United States Patent Office 2,840,986
Patented July 1, 1958

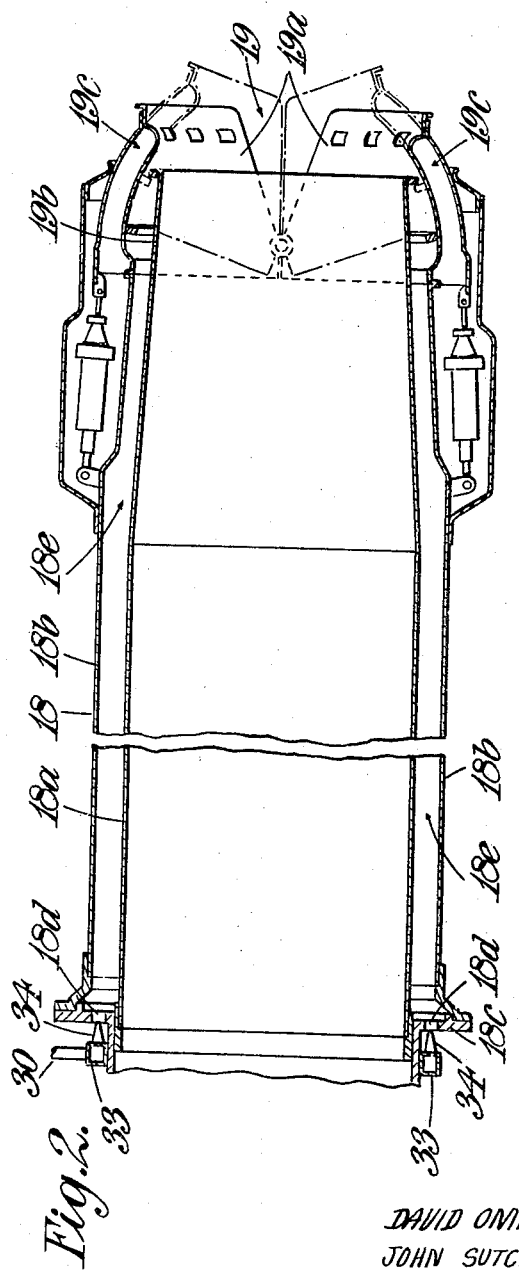

2,840,986

AFTER-BURNER FUEL SUPPLY SYSTEM FOR GAS-TURBINE ENGINES

David Omri Davies, North Kingsway, John Sutcliffe Jones, Wallasey, and George Oulianoff, Allestree, England, assignors to Rolls-Royce Limited, Derby, England, a British company Application April 13, 1953, Serial No. 348,242

Claims priority, application Great Britain April 29, 1952

6 Claims. (Cl. 60—35.6)

This invention relates to fuel supply arrangements for gas-turbine engines and is concerned with fuel supply arrangements employed in connection with reheat combustion equipment of jet-reaction-propulsion gas-turbine engines.

Heretofore it has been proposed to supply fuel to the reheat combustion equipment of a gas-turbine jet-propulsion engine by a fuel supply arrangement including a fuel pump and an air turbine to drive the fuel pump, which air turbine is a two-stage velocity-compounded turbine operated by compressed air tapped-off from the compressor of the gas-turbine engine and exhausting directly to atmosphere so that the pressure ratio across the turbine is substantially the ratio of the air pressure at the tapping point to the atmospheric pressure.

This invention has for an object to provide an improved fuel-supply arrangement for use with reheat combustion equipment and comprising an air-turbine-driven fuel pump and according to this invention the air turbine is connected so that exhaust air therefrom passes to atmosphere through means affording a restriction whereby the pressure ratio across the air turbine is limited.

By so limiting the pressure ratio across the turbine, the run-away speed of the turbine in the event of failure of the fuel supply can be limited. In certain cases it may be arranged that part of the energy in the tapped-off air is recovered in the engine.

According to the preferred arrangement of this invention, the exhaust side of the air turbine is connected to a set of injector nozzles through which the exhaust air from the air turbine is delivered into an annular space between the main wall of the engine jet pipe and an outer encircling wall thus to entrain air to flow through the annular space so as to assist to cool the jet pipe and also if desired to cool the moving nozzle parts of an adjustable-area final nozzle for the jet pipe.

The exhaust air is discharged in a manner limiting the pressure ratio across the turbine and in a manner usefully employing the exhaust air.

According to a feature of this invention, the air turbine which drives the fuel pump is an impulse turbine, that is a turbine in which all the expansion occurs in the stationary nozzles of the turbine, and preferably the turbine is of the two-stage pressure compounded kind i. e. one in which part of the expansion occurs in the first-stage stationary nozzles and part in the second-stage stationary nozzles.

The adoption of the preferred arrangement of the invention gives rise to the advantage as compared with the two-stage velocity-compounded turbine of the same diameter and expansion ratio that the efficiency is improved over the major part of the speed range. Hence in order to obtain the same horsepower per pound of mass flow a lower expansion ratio may be used; manufacture is also facilitated because the rotor blading may be of simpler form having a less camber and a greater radius of curvature at the leading edge due to the lower Mach numbers experienced in the turbine. The use of a two-stage pressure-compounded impulse turbine is also preferable as compared with the use of a single-stage impulse turbine, because, for a given pressure ratio across the turbine, the run-away speed is substantially reduced.

An embodiment of this invention will now be described by way of example as applied in a jet-reaction aircraft propulsion engine wherein the exhaust gases are reheated in the jet pipe when it is desired to increase the thrust of the jet as compared with the thrust obtained from the exhaust gases with the reheat stage inoperative.

The description will make reference to the accompanying diagrammatic drawings in which—

Figure 2 is a cross sectional view through the jet pipe end of the engine.

Figure 1:
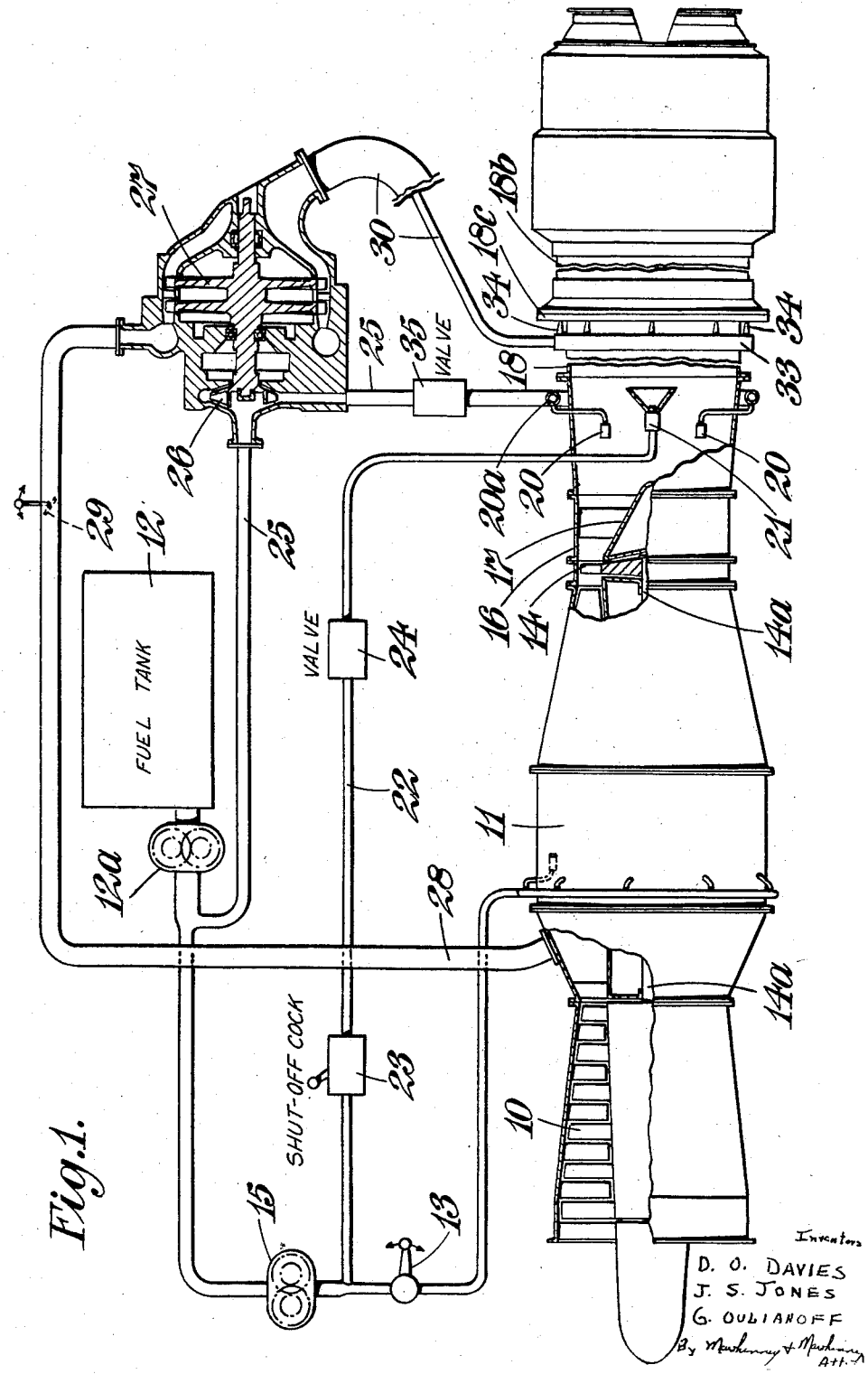
Figure 1 illustrates a gas turbine engine and its fuel systems.

The illustrated form of gas-turbine engine, which is one form of the type of engine with which the invention can be employed with advantage, comprises an axial-flow compressor 10, combustion equipment 11 to which the compressor 10 feeds compressed air and to which fuel is fed from an aircraft fuel tank 12 by any suitable fuel supply system including for example a booster fuel pump 12a, a main fuel pump 15, and a throttle 13 to control the fuel supply, the fuel being burnt with the air which is in excess, an axial-flow turbine 14 arranged to receive the hot products of combustion from the combustion equipment 16, which turbine is connected by a shaft 14a to drive the compressor 10, and an exhaust arrangement comprising a primary exhaust structure having an outer wall 16 and a coaxial conical wall 17 with its base adjacent the turbine, these walls defining an annular exhaust passage leading from the turbine outlet to the apex of the conical wall, a jet pipe 18 extending downstream from the primary exhaust structure and a propelling nozzle 19, which is conveniently adjustable in area by means of rockable nozzle segments 19a and is arranged at the outlet end of the jet pipe 18.

In normal operation of such a gas-turbine engine, the exhaust gases are employed (without being reheated in the jet pipe 18) to produce a propulsive jet, the control of the thrust being achieved by varying the fuel supply to the combustion equipment 11 by means of the throttle 13. In normal operation of the engine, moreover, the nozzle 19 is set to have its minimum area.

In certain circumstances, however, a higher thrust may be required from the engine than can normally be obtained with the throttle 13 fully open and the higher thrust is obtained by burning fuel in the jet pipe 18 and opening out the nozzle segments 19a to give the nozzle 19 its maximum area.

To supply fuel to the jet pipe 18, there is usually provided a number of main burners 20 and a pilot fuel injector 21. The pilot fuel may for instance be supplied from the fuel system of the main combustion equipment 11 say by taking a branch pipe 22 from downstream of the main pump 15 and providing in the branch pipe 22 a shut-off cock 23 and an non-return valve 24.

The main burners 20 may be fed with fuel from a manifold 20a which is connected to a fuel tank, say to fuel tank 12 through booster pump 12a, by means of a pipe line 25 in which is located a main reheat fuel pump 26. The pump 26 is thus in series with the booster pump 12a.

In the arrangement according to this invention, the main reheat fuel pump 26 is driven by an air turbine 27 and the inlet to the air turbine is connected by a conduit 28 to receive compressed air from a tapping point in the engine compressor system 10, for instance, from a tapping point in the compressor delivery section. An air control throttle 29 may be provided in this conduit 28 and the supply of fuel by the main reheat fuel pump 26 to the main reheat burners 20 may be controlled by adjusting the air throttle 29 and thus varying the rotational speed of the air turbine 27.

In order to avoid an excessive run-away speed of the air turbine, it is arranged according to this invention that the pressure ratio across the air turbine 27, that is the ratio of the air pressure at the turbine inlet to the air pressure at the turbine outlet, is limited.

The jet pipe 18 has a double-walled section whereof the inner wall 18a defines the exhaust gas passage from the engine turbine 14 and terminates in nozzle portion 19b defining the maximum orifice area of the propelling nozzle 19 and whereof the outer wall 18b extends from a flange part 18c affording a ring of air inlets 18d to the annular space 18e which extends lengthwise of the jet pipe 18 to adjacent the propelling nozzle 19. The nozzle segments 19a in this case are conveniently hollow having passages 19c within them, which, when the segments are in the minimum area position (chain lines), place the space 18e in communication with outlets in the downstream edges of the nozzle segments 19a so that cooling air is induced by the jet stream to flow through the space 18e from the air inlets 18d to the outlets afforded by passages 19c. The exhaust air flowing from the air turbine 27 through an air conduit 30 is delivered to a manifold 33 encircling the jet pipe 18 adjacent the air inlets 18d and a series of injector nozzles 34 extend from the manifold 33 to deliver the exhaust air through the inlets 18d thereby to entrain cooling air from externally of the jet pipe into space 18e. The air turbine exhaust air is thus used for cooling the jet pipe 18 and the nozzle segments 19a. Preferably it is arranged that the injector nozzles 34 are choked in operation. It will be clear that the pressure ratio across the air turbine is limited so that the run-away speed will be limited, and that when the pressure ratio across injector nozzles 34 is at or above the choking value, the pressure ratio across the turbine will be constant.

It may also be necessary to use the injector nozzles 34 to produce the cooling action for the jet pipe 18 and propelling nozzle 19 under non-reheat conditions, that is, when the air-turbine 27 is inoperative, and in this case a two-way valve may be provided in the conduit 28 between the control valve 29 and the air-turbine 27, and a conduit containing a restrictor led from this two-way valve to the conduit 30, thus by-passing the air-turbine 27. In this way, cooling of the jet pipe 18 and propelling nozzle 19 by means of the action of the injectors 34 may be obtained under both reheat and non-reheat conditions by appropriate selection of the position of the two-way valve.

Referring again to Figure 1, it will be seen that the air-turbine 27 is illustrated as a two-stage turbine and it is preferred that the turbine be a two-stage pressure-compounded impulse turbine, since for a given pressure ratio across the turbine it is more efficient and easier to manufacture than a two-stage velocity-compounded turbine such as has been used hitherto.

We claim:

1. In combination, a jet-reaction-propulsion gas turbine engine, a jet pipe connected to receive exhaust gases from the engine and adapted to deliver the exhaust gases to atmosphere as a propulsive jet, said jet-pipe comprising an inner wall defining the exhaust gas passage and an outer wall around the inner wall and spaced therefrom to form an annular cooling air passage with an inlet at one end, and means to deliver fuel into the jet pipe to be burnt with the exhaust gases therein including fuel injectors adapted to deliver into the jet pipe, a fuel pump connected to deliver fuel to said fuel injectors, an air-turbine connected to the fuel pump to drive it, a manifold adjacent said inlet to the annular cooling air passage and connected to receive exhaust air from said air turbine, and injector nozzles connected to said manifold and adapted to afford a restriction to the flow of air therefrom, said restriction being so dimensioned that the pressure ratio across the air turbine is limited, and said injector nozzles co-operating with said inlet to entrain cooling air from externally of the jet pipe and to induce it to flow through said annular cooling air passage.

2. The combination according to claim 1, wherein said injector nozzles are adapted to be choked in normal operation by the exhaust air flow therethrough.

3. In combination, a jet-reaction-propulsion gas turbine engine, a jet pipe connected to receive exhaust gases from the engine and adapted to deliver the exhaust gases to atmosphere as a propulsive jet, said jet-pipe comprising an inner wall defining the exhaust gas passage and an outer wall around the inner wall and spaced therefrom to form an annular cooling air passage with an inlet at one end, and means to deliver fuel into the jet pipe to be burnt with the exhaust gases therein including fuel injectors adapted to deliver into the jet pipe, a fuel pump connected to deliver fuel to said fuel injectors, an air-turbine connected to the fuel pump to drive it, a manifold adjacent said inlet to the annular cooling air passage and connected to receive exhaust air from said air turbine, restricted passage means connecting the manifold to the annular cooling air passage, whereby the pressure ratio across the air turbine is limited, and moving nozzle parts co-operating with said jet pipe at its outlet end and movable to vary the effective area of the outlet, said nozzle parts being adapted to be cooled in operation by air flowing out from said annular cooling air passage.

4. In combination, a jet-reaction-propulsion gas turbine engine, a jet pipe connected to receive exhaust gases from the engine and adapted to deliver the exhaust gases to atmosphere as a propulsive jet, said jet-pipe comprising an inner wall defining the exhaust gas passage and an outer wall around the inner wall and spaced therefrom to form an annular cooling air passage with an inlet at one end, and means to deliver fuel into the jet pipe to be burnt with the exhaust gases therein including fuel injectors adapted to deliver into the jet pipe, a fuel pump connected to deliver fuel to said fuel injectors, an air-turbine connected to the fuel pump to drive it, and injector nozzles connected to receive exhaust air from said air turbine and adapted to afford a restriction to the flow of air therefrom, said restriction being so dimensioned that the pressure ratio across the air turbine is limited, said injector nozzles being adjacent and co-operating with said inlet to entrain cooling air from externally of the jet pipe and to induce it to flow through said annular cooling air passage.

5. The combination according to claim 4, wherein said injector nozzles are adapted to be choked in normal operation by the exhaust air flow therethrough.

6. The combination according to claim 4, wherein said air turbine is a two-stage pressure-compounded impulse turbine.

References Cited in the file of this patent

UNITED STATES PATENTS

| Number | Name | Date |
| --- | --- | --- |
| 1,369,672 | Koenig | Feb. 22, 1921 |
| 2,280,835 | Lysholm | Apr. 28, 1942 |
| 2,356,557 | Anxionnaz et al. | Aug. 22, 1944 |
| 2,487,842 | Whiteman et al. | Nov. 15, 1949 |
| 2,514,513 | Price | July 11, 1950 |
| 2,540,594 | Price | Feb. 6, 1951 |
| 2,582,848 | Price | Jan. 15, 1952 |
| 2,612,020 | Griffith | Sept. 30, 1952 |
| 2,630,673 | Woll | Mar. 10, 1953 |
| 2,640,316 | Neal | June 2, 1953 |
| 2,693,674 | Anxionnaz et al. | Nov. 9, 1954 |
| 2,739,442 | Neal et al. | Mar. 27, 1956 |

FOREIGN PATENTS

| Number | Country | Date |
| --- | --- | --- |
| 664,656 | Great Britain | Jan. 9, 1952 |
| 666,944 | Great Britain | Feb. 20, 1952 |